(12) United States Patent
Husted (10) Patent No.: US 8,358,728 B2
(45) Date of Patent: Jan. 22, 2013

(54) CALIBRATION OF SYNTHESIZER PHASE USING REFERENCE HARMONIC

(75) Inventor: Paul J. Husted, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 12/987,059

(22) Filed: Jan. 7, 2011

(65) Prior Publication Data

US 2012/0177161 A1     Jul. 12, 2012

(51) Int. Cl.
*H03D 3/24* (2006.01)

(52) U.S. Cl. ........ 375/373; 375/371; 375/375; 375/376; 375/326; 375/327; 455/84; 455/86; 455/87

(58) Field of Classification Search ........... 375/373, 375/371, 375, 376, 326, 327; 455/84, 86, 455/87
See application file for complete search history.

(56) References Cited

U.S. PATENT DOCUMENTS

| | | | |
|---|---|---|---|
| 6,868,261 B2 * | 3/2005 | Shi et al. | 455/114.2 |
| 7,411,461 B2 * | 8/2008 | Siddall | 331/1 R |
| 7,747,236 B1 | 6/2010 | Poberezhskiy et al. | |
| 2002/0084933 A1 | 7/2002 | Krasner | |
| 2002/0163391 A1 * | 11/2002 | Peterzell | 331/25 |
| 2003/0040292 A1 * | 2/2003 | Peterzell et al. | 455/147 |
| 2004/0132421 A1 * | 7/2004 | Underbrink | 455/255 |
| 2005/0069055 A1 | 3/2005 | Song et al. | |
| 2005/0190829 A1 | 9/2005 | Lu et al. | |
| 2009/0295435 A1 * | 12/2009 | Gabato et al. | 327/107 |

FOREIGN PATENT DOCUMENTS

| | | |
|---|---|---|
| EP | 1739846 A2 | 1/2007 |
| WO | WO9608883 A1 | 3/1996 |
| WO | WO9957929 A1 | 11/1999 |
| WO | WO2012094650 | 7/2012 |

OTHER PUBLICATIONS

International Search Report and Written Opinion—PCT/US2012/020563—ISA/EPO—May 22, 2012, 15 pages.

* cited by examiner

*Primary Examiner* — Phuong Phu
(74) *Attorney, Agent, or Firm* — DeLizio Gilliam, PLLC (57) ABSTRACT

Arbitrary phase variations of a shared frequency synthesizer can be calibrated using a reference harmonic each time the shared frequency synthesizer is allocated to a network device to enable one frequency synthesizer to be shared between multiple network devices. On determining that the shared frequency synthesizer has been allocated to the network device, an output frequency of the shared frequency synthesizer can be aligned with a predetermined reference frequency that is associated with an operating frequency band of the network device. A phase correction factor associated with the shared frequency synthesizer can be calculated from a signal calculated based, at least in part, on the output frequency of the shared frequency synthesizer and the predetermined reference frequency. The phase correction factor is applied to a signal received at the network device to correct a phase error associated with the shared frequency synthesizer.

25 Claims, 5 Drawing Sheets

CALIBRATION OF SYNTHESIZER PHASE USING REFERENCE HARMONIC

BACKGROUND

Embodiments of the inventive subject matter generally relate to the field of communication networks and, more particularly, to calibration of synthesizer phase using a reference harmonic.

Electronic devices can comprise two or more communication devices that share one or more signal processing units. For example, a wireless local area network (WLAN) device and a global positioning system (GPS) navigation device can time-share a common signal processing unit such as a frequency synthesizer. The shared frequency synthesizer can generate a GPS reference carrier frequency (e.g., a 1575.42 MHz signal or a 1227.60 MHz signal) when the shared frequency synthesizer is allocated to the GPS navigation device. The shared frequency synthesizer can generate a WLAN reference carrier frequency (e.g., a 2.4 GHz signal, a 5 GHz signal, etc) when the shared frequency synthesizer is allocated to the WLAN device.

SUMMARY

Various embodiments for calibrating synthesizer phase using a reference harmonic are disclosed. In one embodiment, it is determined, at a first network device, that a shared frequency synthesizer that is shared between the first network device and a second collocated network device has been allocated to the first network device. A predetermined reference frequency that is associated with an operating frequency band of the first network device is generated. An output frequency of the shared frequency synthesizer is aligned with the predetermined reference frequency. A difference frequency signal is generated based, at least in part, on the output frequency of the shared frequency synthesizer and the predetermined reference frequency. A phase correction factor associated with the shared frequency synthesizer is determined based, at least in part, on the difference frequency signal. The phase correction factor is applied to a signal received at the first network device to correct a phase error associated with the shared frequency synthesizer.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to a GPS navigation device determining and correcting phase errors associated with a shared frequency synthesizer, embodiments are not so limited. In some embodiments, techniques for determining and correcting phase errors associated with the shared frequency synthesizer can be implemented by other navigation devices that use various other navigation satellites (e.g., GLONASS satellites, a combination of GPS and GLONASS satellites), wired/wireless communication devices (e.g., WLAN devices, Bluetooth® devices, etc.). In other instances, well-known instruction instances, protocols, structures, and techniques have not been shown in detail in order not to obfuscate the description.

A frequency synthesizer can generate a frequency tone at a reference carrier frequency based off of a reference signal (e.g., from a system reference clock). This frequency tone can enable a communication device to process (e.g., demodulate) a received signal. When the frequency synthesizer is shared between multiple communication devices (e.g., between a WLAN device and a GPS navigation device, between a Bluetooth device and a GPS navigation device, etc.), the shared frequency synthesizer typically generates an appropriate reference carrier frequency depending on the communication device to which the shared frequency synthesizer is allocated. In some implementations, when the shared frequency synthesizer is switched between a first communication device and a second communication device, the initial phase of the reference carrier frequency can vary from one instance of generating the reference carrier frequency for the first communication device to another instance of generating the reference carrier frequency for the first communication device.

For example, the shared frequency synthesizer may be switched between the GPS navigation device and the Bluetooth device multiple times while the GPS navigation device is receiving a GPS signal. In one example, the Bluetooth device may communicate (and may therefore be allocated the shared frequency synthesizer) for 1.25 ms every 3.75 ms. The GPS navigation device may correlate the received GPS signal with a pseudo-random code for 20 ms to accurately receive a codeword of the GPS packet. Thus, to share the frequency synthesizer between the GPS navigation device and the Bluetooth device, the shared frequency synthesizer may be allocated from the GPS navigation device to the Bluetooth device at least five times during the 20 ms time interval when the GPS navigation device is receiving the GPS packet. The GPS navigation device performs phase-coherent correlation on the received GPS signal to ensure proper reception of the GPS packet. However, the shared frequency synthesizer may settle on the reference GPS carrier frequency with a different arbitrary phase each time the shared frequency synthesizer is re-allocated to the GPS navigation device. In other words, the shared frequency synthesizer may generate a GPS reference carrier frequency signal with a first phase when the shared frequency synthesizer is first allocated to the GPS navigation device. The shared frequency synthesizer may then be allocated to the Bluetooth device, where the shared frequency synthesizer may generate a Bluetooth reference carrier frequency signal. When the shared frequency synthesizer is allocated again to the GPS navigation device, the shared frequency synthesizer may generate the GPS reference carrier frequency signal with a second phase that is different from the first phase. Because the GPS navigation device expects the phase of the GPS reference carrier signal to be constant, at least during the reception of a 20 ms long codeword of the GPS packet, the tendency of the shared frequency synthesizer to generate the reference carrier frequency signal with a different arbitrary phase each time the shared frequency synthesizer settles on the reference carrier frequency can impair coherent detection of the GPS navigation device. Although coherent detection can be enabled at the GPS navigation device by allocating a dedicated frequency synthesizer to each of the communication devices, this implementation can result in an increase in chip area, cost, and power consumption.

Functionality can be implemented to determine the arbitrary phase of the shared frequency synthesizer for phase-coherent correlation of the received GPS signal when the shared frequency synthesizer is allocated to the GPS navigation device. To enable coherent detection for each segment of the received GPS signal, the phase of the shared frequency synthesizer can be calibrated each time the shared frequency synthesizer locks onto the GPS reference carrier frequency. A spur signal can be generated at a harmonic frequency of the system reference clock frequency. The harmonic frequency can be selected so that the harmonic frequency is within a GPS frequency band. The spur signal can be used to estimate and correct the arbitrary phase of the reference carrier frequency signal generated by the shared frequency synthesizer. The shared frequency synthesizer can be aligned with the spur signal and the spur signal can then mixed to DC (i.e., a 0 Hz signal) at the output of the shared frequency synthesizer. The phase of the DC signal is equivalent to the arbitrary phase of the shared frequency synthesizer (after compensating for DC offsets introduced by processing components of the GPS navigation device). The arbitrary phase of the shared frequency synthesizer can be corrected to enable coherent detection of the GPS signal. Techniques for shared frequency synthesizer phase calibration as described herein can enable one frequency synthesizer to be shared between multiple communication devices. This, in turn, can minimize time required for GPS correlation and can also minimize chip area, power consumption, and cost.

Figure 1:
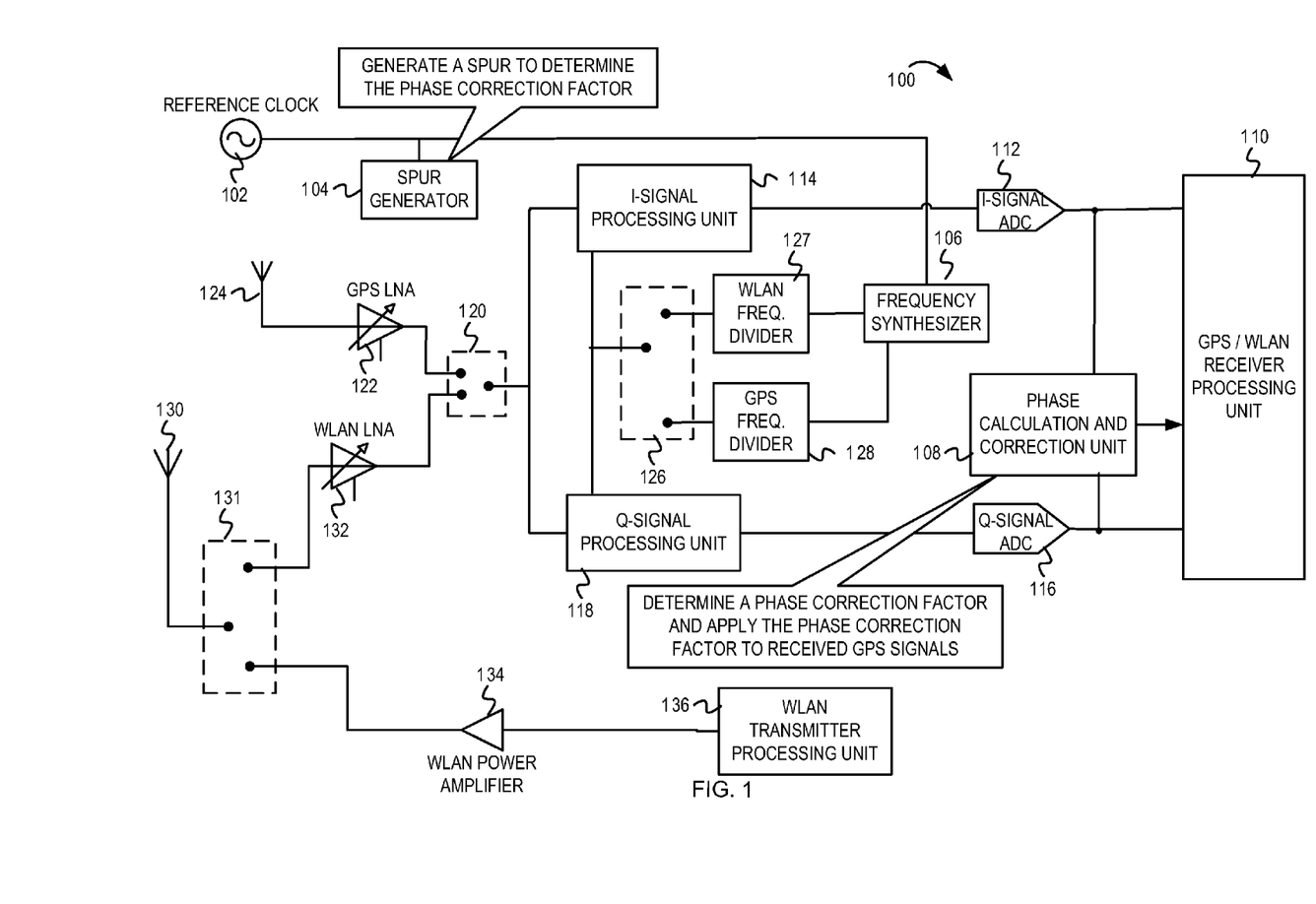
FIG. 1 is an example block diagram illustrating calibration of synthesizer phase using a reference harmonic.

FIG. 1 is an example block diagram illustrating calibration of synthesizer phase using a reference harmonic. FIG. 1 depicts an electronic device 100 comprising a wireless local area network (WLAN) device and a global positioning system (GPS) navigation device. In one implementation, the WLAN device and the GPS navigation device can be collocated on a common chip (e.g., a common integrated circuit, a system on a chip (SoC), etc.). In another implementation, the WLAN device and the GPS navigation device can be implemented on separate chips and can then be coupled together. The electronic device 100 comprises a system reference clock 102 coupled to a spur generator 104 and a shared frequency synthesizer 106. In some examples, the system reference clock 102 may be determined based on an external crystal oscillated by an on-chip oscillator circuit, or based on an external temperature compensated crystal oscillator (TCXO). The electronic device 100 comprises a GPS antenna 124 connected to a GPS LNA 122. The electronic device 100 also comprises a WLAN antenna 130 coupled to the transmit path of the WLAN device and to the receive path of the WLAN device via a switch 131. Depending on whether a WLAN signal is to be transmitted or received, the switch 131 can couple the WLAN antenna 130 to a WLAN power amplifier 134 or to a WLAN LNA 132, respectively. Depending on whether a GPS signal or a WLAN signal is received, either the GPS signal or the WLAN signal can be coupled to the receiver circuitry of the electronic device 100 via a switch 120. The first selection terminal of the switch 120 is connected to the GPS LNA 122 and the second selection terminal of the switch 120 is connected to the WLAN LNA 132. The common terminal of the switch 120 is connected to an in-phase signal (I-signal) processing unit 114 and also to a quadrature signal (Q-signal) processing unit 118. The shared frequency synthesizer 106 is further coupled to the I-signal processing unit 114 and to the Q-signal processing unit 118 via a switch 126. The common terminal of the switch 126 is connected to the I-signal processing unit 114 and to the Q-signal processing unit 118. The shared frequency synthesizer 106 is connected to one selection terminal of the switch 126 via a WLAN frequency divider 127. The shared frequency synthesizer 106 is connected to the second selection terminal of the switch 126 via a GPS frequency divider 128. In some implementations, the shared frequency synthesizer 106 can operate at a frequency (i.e., generate a frequency output) that is different from a WLAN operating frequency and a GPS operating frequency. For example, the output frequency of the shared frequency synthesizer 106 may be 3.2 GHz. The WLAN frequency divider 127 can divide the output frequency of the shared frequency synthesizer 106 in a ⅔, ⅓ scheme to yield a 2.4 GHz frequency signal for processing WLAN signals. The GPS frequency divider 128 can divide the output frequency of the shared frequency synthesizer 106 by 2 to yield a 1.6 GHz frequency signal for processing GPS signals. The output of the I-signal processing unit 114 is provided to an I-signal ADC 112. The output of the Q-signal processing unit 118 is provided to a Q-signal ADC 116. The output of the I-signal ADC 112 and the output of the Q-signal ADC 116 are provided to a phase calculation and correction unit 108 (further described with reference to FIG. 2). The output of the phase calculation and correction unit 108, the output of the I-signal ADC 112, and the output of the Q-signal ADC 116 are provided to a GPS/WLAN receiver unit 110. The transmit path of the WLAN device comprises a WLAN transmitter processing unit 136, and the WLAN power amplifier 134. The WLAN power amplifier 134 is coupled to the WLAN antenna 130 via the switch 131. It is noted that although FIG. 1 depicts the electronic system 100 comprising a distinct WLAN antenna 130 and GPS antenna 124 for receiving WLAN signals and GPS signals, respectively, embodiments are not so limited. In another embodiment, the WLAN device and the GPS device could share a common receiver antenna via a diplexer that appropriately routes received WLAN signal to the WLAN device and received GPS signals to the GPS device.

In the transmit path of the WLAN device, the WLAN transmitter processing unit 136 processes the data to be transmitted to generate a WLAN transmit signal. The WLAN transmitter processing unit 136 can comprise one or more filters, one or more mixers, a digital to analog converter (DAC), a modulation and coding unit, one or more amplifiers, etc. Although not depicted in FIG. 1, in some implementations, the transmit path of the WLAN device can comprise a distinct I-signal transmitter processing unit and a Q-signal transmitter processing unit that generates an I-signal and a Q-signal, respectively, from data to be transmitted. The transmit path of the WLAN device can also comprise a signal combiner to combine the I-signal and the Q-signal to generate the WLAN transmit signal. The WLAN power amplifier 134 amplifies the WLAN transmit signal. The switch 131 couples the WLAN power amplifier 134 to the WLAN antenna 130. The WLAN power amplifier 134 provides the WLAN transmit signal for transmission via the WLAN antenna 130.

In the receive path of the WLAN device, the WLAN device receives a WLAN signal via the WLAN antenna 130. The switch 131 couples the WLAN antenna 130 to the receive path of the WLAN device and the WLAN LNA 132. The WLAN LNA 132 amplifies the received WLAN signal. When the WLAN device receives the WLAN signal, the output of the WLAN LNA 132 (e.g., the amplified received WLAN signal) can be coupled to the I-signal processing unit 114 and to the Q-signal processing unit 118 via the switch 120. The I-signal processing unit 114 and the Q-signal processing unit 118 can also be coupled to the shared frequency synthesizer 106 via the switch 126. The WLAN frequency divider 127 can filter the output frequency of the shared frequency synthesizer 106 so that the frequency signal (at the output of the WLAN frequency divider 127) provided to the I-signal processing unit 114 and the Q-signal processing unit 118 is within the WLAN frequency band. In some implementations, a received signal monitoring unit (not shown) or a synthesizer control unit (depicted in FIG. 2) can determine whether the WLAN device or the GPS navigation device has control of the receiver processing circuitry (and the shared frequency synthesizer) and can accordingly generate control signals to cause the switch 120 and the switch 126 to couple the appropriate received signals to the receiver processing circuitry.

The I-signal processing unit 114 and the Q-signal processing unit 118 can each comprise low pass filters, mixer stages, local oscillators, etc. In one implementation, the output frequency of the shared frequency synthesizer 106 (coupled via the switch 126) can drive the local oscillators of the I-signal processing unit 114 and the Q-signal processing unit 118. In another implementation, however, the system reference clock 102 can drive the local oscillators. In some implementations, the phase calculation and correction unit 108 can be decoupled from the receiver processing circuitry when the WLAN signal is received. In another implementation, a blanking control signal can be applied to the phase calculation and correction unit 108 to temporarily suspend operations of the phase calculation and correction unit 108, as will be described with reference to FIG. 2. The output of the I-signal processing unit 114 and the Q-signal processing unit 118 are provided to the I-signal ADC 112 and to the Q-signal ADC 116, respectively. The I-signal ADC 112 and the Q-signal ADC 116 can convert their respective input signals from the analog domain to the digital domain. The output of the I-signal ADC 112 and the Q-signal ADC 116 are provided to the GPS/WLAN receiver processing unit 110 for subsequent processing. The GPS/WLAN receiver processing unit 110 can comprise a Fast Fourier transform (FFT) unit, filter stages, gain stages, mixers, a demodulation unit, a decoding/decryption unit, etc. The GPS/WLAN receiver processing unit 110 can process the I-signal and the Q-signal received from the I-signal ADC 112 and the Q-signal ADC 116, respectively, to yield data transmitted from a transmitting WLAN device.

When the GPS navigation device has control of the receiver processing circuitry of the electronic device 100, the GPS antenna 124 receives a GPS signal. The GPS LNA 122 amplifies the GPS signal. When the GPS antenna 124 receives the GPS signal, the output of the GPS LNA 122 (e.g., the amplified received GPS signal) can be coupled to the I-signal processing unit 114 and to the Q-signal processing unit 118 via the switch 120. The I-signal processing unit 114 and the Q-signal processing unit 118 can also be coupled to the shared frequency synthesizer 106 via the switch 126. As described above, control signals can be generated to cause the switch 120 and the switch 126 to couple the received GPS signal to the receiver processing circuitry on determining that the GPS signal is being received. The GPS frequency divider 128 filters the output frequency generated by the shared frequency synthesizer 106 so that the frequency signal (at the output of the GPS frequency divider 128) provided to the I-signal processing unit 114 and the Q-signal processing unit 118 is within the GPS frequency band. In some implementations, the phase calculation and correction unit 108 can be enabled (or can be coupled to the receiver processing circuitry) on determining that the GPS navigation device has control of the receiver processing circuitry and that the GPS signal is being received. In another implementation, a blanking control signal may no longer be applied to the phase calculation and correction unit 108 on determining that the GPS signal is being received (as will be further described in FIG. 2). The output of the I-signal processing unit 114 and the Q-signal processing unit 118 are provided to the I-signal ADC 112 and to the Q-signal ADC 116, respectively. The output of the I-signal processing unit 114 and the Q-signal processing unit 118 are also provided to the phase calculation and correction unit 108. The phase calculation and correction unit 108 can determine a phase correction factor associated with the shared frequency synthesizer 106 and can apply the phase correction factor to the received GPS signal, as will be described with reference to FIG. 2.

Figure 2:
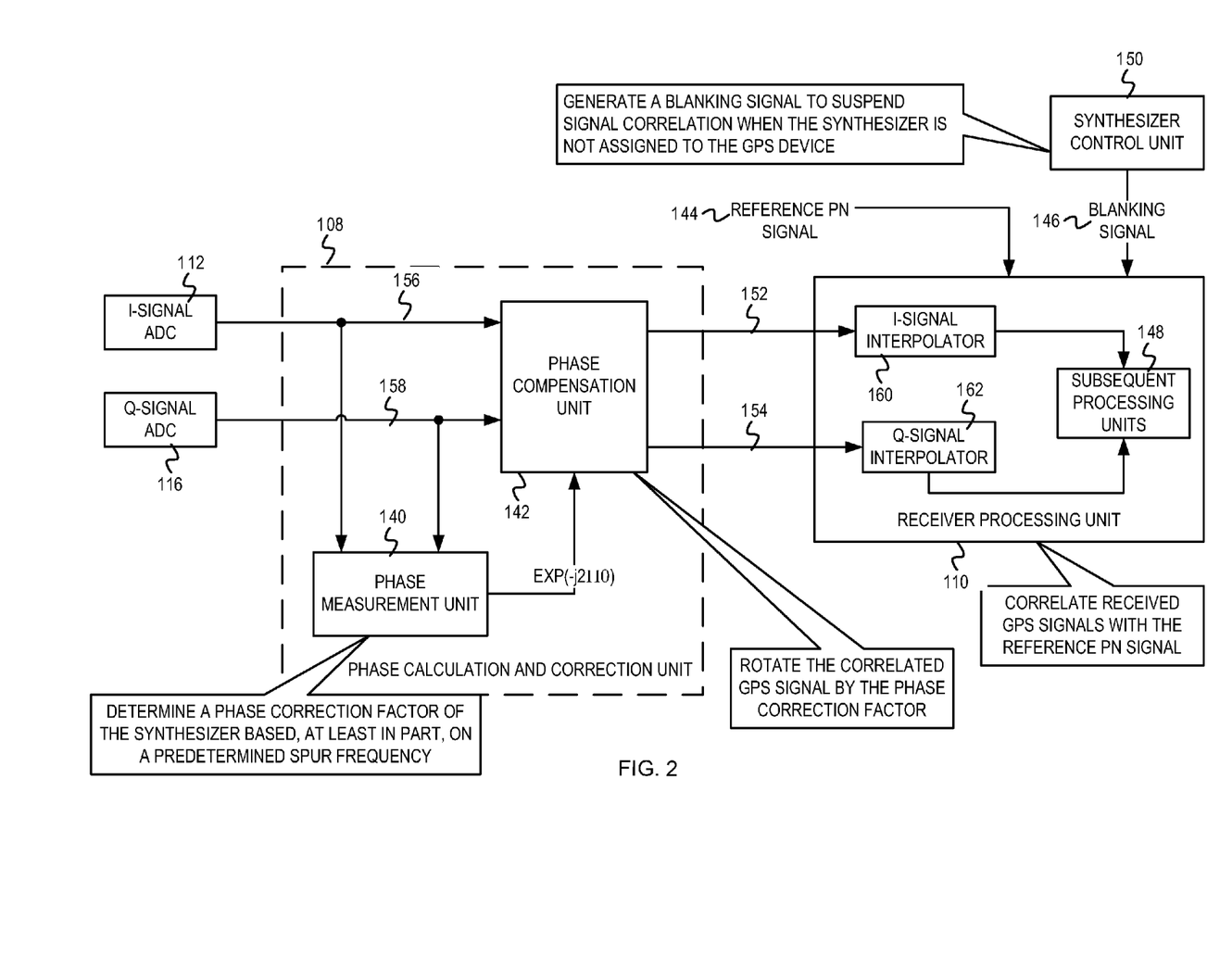
FIG. 2 is an example block diagram illustrating the phase calculation and correction unit configured for estimating and correcting a phase error of the shared frequency synthesizer.

FIG. 2 is an example block diagram illustrating the phase calculation and correction unit 108 configured for estimating and correcting a phase error of the shared frequency synthesizer. As illustrated in FIG. 2, in one embodiment, the phase calculation and correction unit 108 comprises a phase measurement unit 140 and a phase compensation unit 142. The phase compensation unit 142 is coupled to an I-signal interpolator 160 and a Q-signal interpolator 162. The I-signal interpolator 160 and the Q-signal interpolator 162 are coupled to subsequent processing units 148 of the GPS navigation device. In one embodiment, the I-signal interpolator 160, the Q-signal interpolator 162, and the subsequent processing units 148 of the GPS navigation device constitute the receiver processing unit 110. The receiver processing unit 110 is coupled to a synthesizer control unit 150.

As described with reference to FIG. 1, the I-signal ADC 112 and the Q-signal ADC 116 generate and provide the I-signal component 156 and the Q-signal component 158 of the received GPS signal to the phase measurement unit 140 of the phase calculation and correction unit 108. The phase measurement unit 140 determines a phase error (represented as "θ" in FIG. 2) associated with the shared frequency synthesizer 106 from the I-signal component 156 and the Q-signal component 158 of the received GPS signal. The phase measurement unit 140 can provide a phase correction factor (represented as $\exp(-j2\pi\theta)$ in FIG. 2) to the phase compensation unit 142. The phase compensation unit 142 can apply the phase correction factor to the I-signal component 156 and the Q-signal component 158 of the received GPS signal to yield a phase compensated I-signal component 152 and a phase compensated Q-signal component 154 of the received GPS signal, respectively. The phase compensation unit 142 can rotate the phase of the input I-signal component 156 and the Q-signal component 158 by the phase correction factor, in the opposite direction, to yield the phase compensated I-signal component 152 and the compensated Q-signal component 154, as will be further described below with reference to FIG. 4. Furthermore, because the I-signal ADC 112 and the Q-signal ADC 116 are clocked based on a divided down version of the output frequency of the shared frequency synthesizer 106, any phase error associated with the shared frequency synthesizer 106 can translate into a corresponding phase error associated with a clock of the I-signal ADC 112 and the Q-signal ADC 116 ("ADC clock"). As depicted in FIG. 2, the phase compensation unit 142 can also apply the phase correction factor to the I-signal interpolator 160 and the Q-signal interpolator 162 in the time domain to adjust the effective sampling time of the ADC clock.

The phase compensated I-signal component 152 and the phase compensated Q-signal component 154 of the GPS signal can then be provided for subsequent processing. The subsequent processing components 148 of the GPS navigation device can comprise one or more correlators, spur filtering units, mixers, filter stages, amplifiers, and other data processing units. For example, the correlators can correlate the phase compensated I-signal component 152 and the phase compensated Q-signal component 154 of the GPS signal with reference pseudorandom number (PN) signals. In one implementation, the correlators can be implemented as part of the GPS/WLAN receiver processing unit 110. Subsequent processing of the phase compensated I-signal component 152 and the phase compensated Q-signal component 154 of the GPS signal can enable the GPS navigation device to identify the navigation satellite that transmitted the GPS signal, to determine timing and frequency offset information, and to ultimately determine a position of the GPS navigation device.

In one implementation, the synthesizer control unit 150 can transfer control of the shared frequency synthesizer 106 between the WLAN device and the GPS navigation device depending on whether the WLAN device is scheduled to receive WLAN signals. The synthesizer control unit 150 may generate control signals to couple either the received WLAN signal or the received GPS signal to the receiver processing circuitry. For example, the shared frequency synthesizer 106 can be allocated, by default, to the GPS navigation device. The synthesizer control unit 150 can allocate the shared frequency synthesizer 106 to the WLAN device on determining that the WLAN device is scheduled to receive or transmit a WLAN signal. Prior to allocating the shared frequency synthesizer 106 to the WLAN device, the synthesizer control unit 150 can provide a blanking control signal 146 to correlators that constitute the one or more processing components 148 of the GPS navigation device. The blanking control signal 146 can serve as an indication that the shared frequency synthesizer 106 is currently not allocated to the GPS navigation device. Consequently, the blanking control signal 146 can also indicate that the input to the phase calculation and correction unit 108 is not within the GPS frequency band. In one example, the blanking control signal 146 may serve to disable the correlators of the GPS navigation device. The blanking control signal 146 may also serve to disable the phase calculation and correction unit 108 (e.g., when the received GPS signal is not coupled to the receiver processing circuitry). It is noted, however, that when the phase calculation and correction unit 108 operates on WLAN received signals, the blanking control signal 146 may not disable the phase calculation and correction unit 108. After the WLAN device relinquishes control of the shared frequency synthesizer 106 and/or after the WLAN device has received the WLAN signal, the synthesizer control unit 150 can remove the blanking control signal 146 to indicate that the shared frequency synthesizer 106 is now allocated to the GPS navigation device.

In one implementation, the synthesizer control unit 150 can transmit a message comprising a blanking field (one or more blanking bits) to the correlators that constitute the processing components 148 of the GPS navigation device. The synthesizer control unit 150 can transmit a first predetermined value in the blanking field to indicate that control of the shared frequency synthesizer 106 and the receiver processing circuitry has been allocated to the WLAN device. The synthesizer control unit 150 can transmit a second predetermined value in the blanking field when control of the shared frequency synthesizer 106 and the receiver processing circuitry is allocated to the GPS navigation device. In another implementation, the synthesizer control unit 150 can transmit a predetermined voltage level on a physical wire to indicate that the shared frequency synthesizer 106 and the receiver processing circuitry are currently not allocated to the GPS navigation device. As described above, on receiving the blanking control signal 146, the correlators can suspend correlation operations. The correlators, however, may continue to track the reference PN signal 144 so that the correlators can resume correlation of the GPS signal with the reference PN signal 144 when the GPS signal is coupled to the receiver processing circuitry. In some implementations, although not depicted in FIG. 2, the phase calculation and correlation unit 108 may also receive the blanking control signal 146 and may temporarily suspend phase calculation and correction operations when the shared frequency synthesizer 106 is not allocated to the GPS navigation device.

Figure 3:
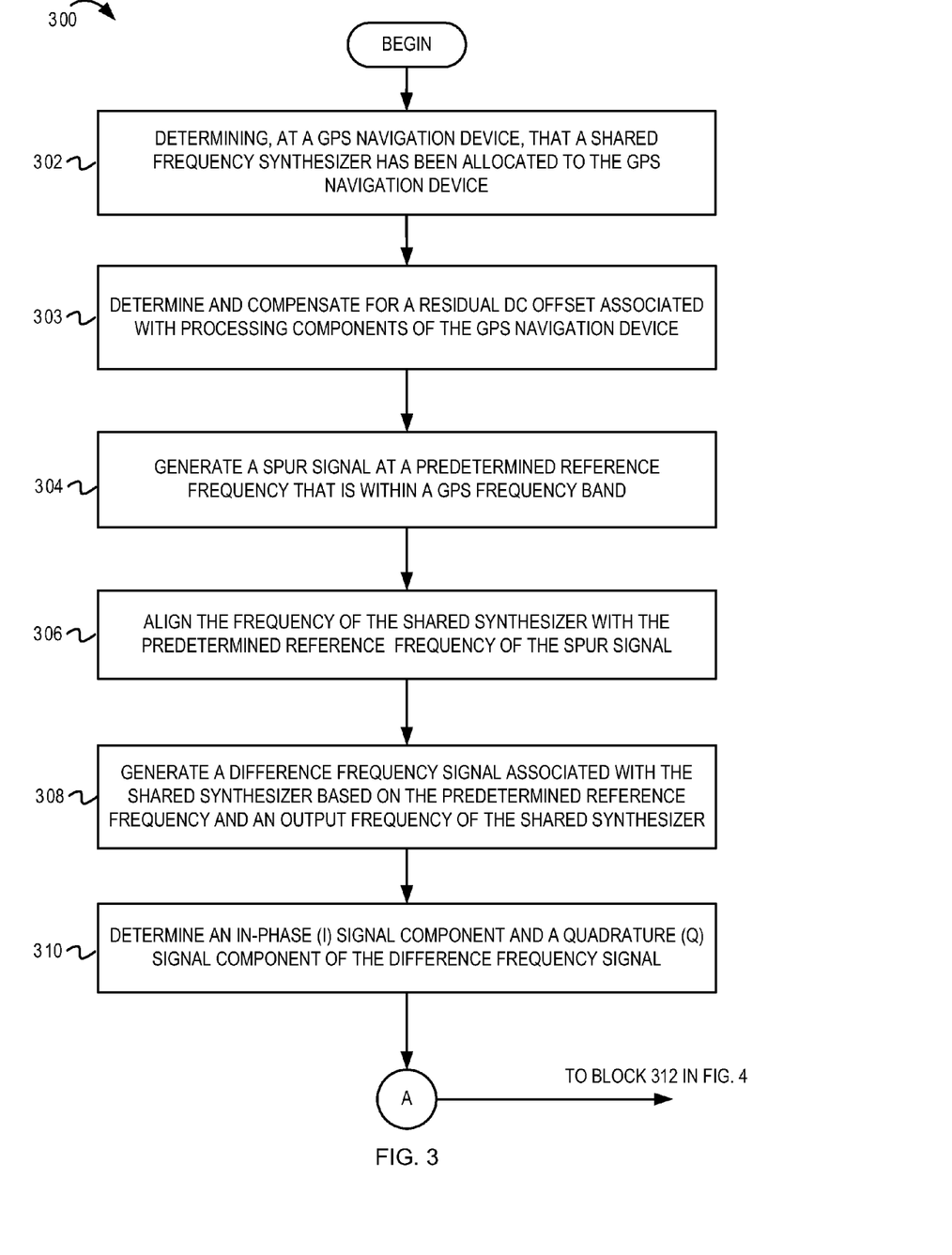
FIG. 3 is a flow diagram illustrating example operations for calculating a phase error of a shared frequency synthesizer
Figure 4:
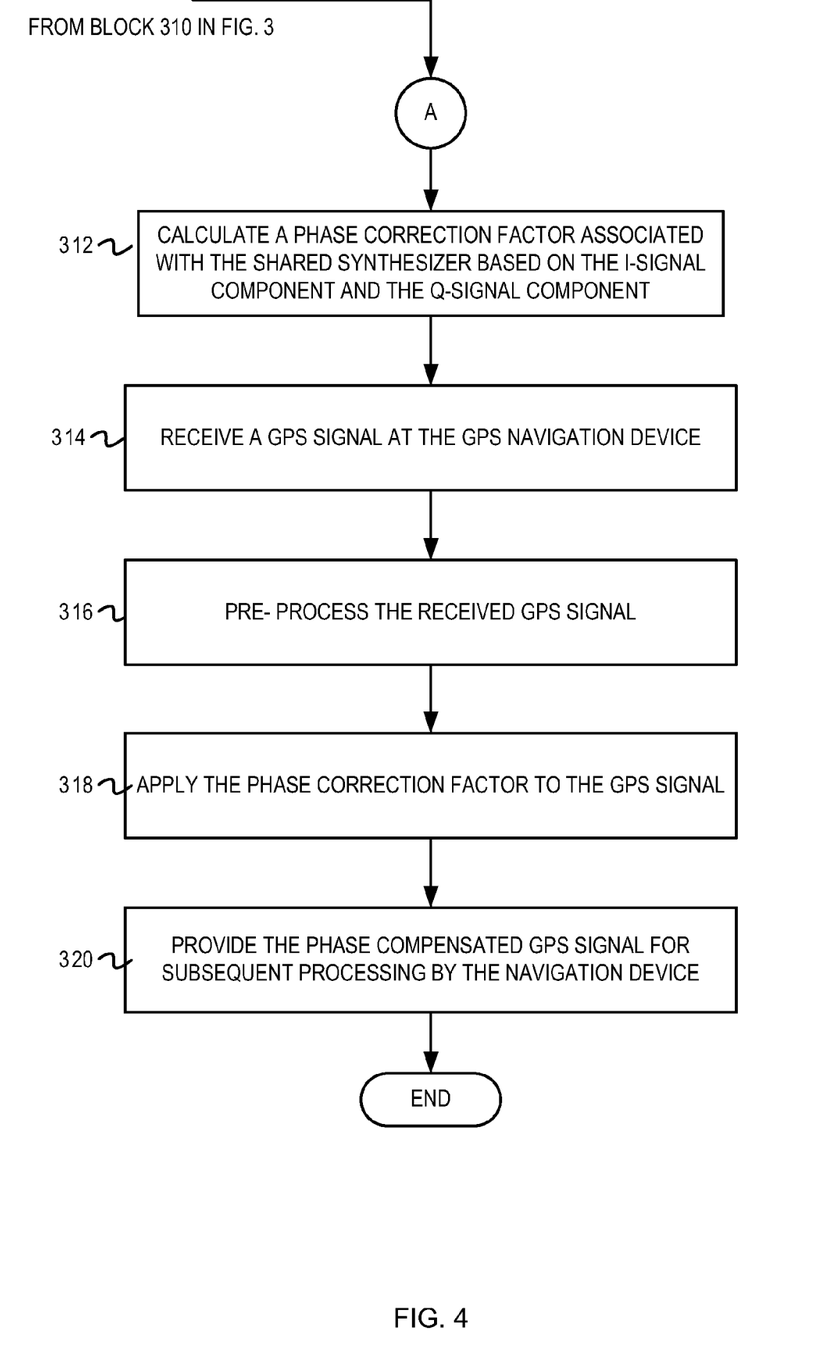
FIG. 4 is a continuation of FIG. 3 and depicts a flow diagram illustrating example operations for correcting the phase error of the shared frequency synthesizer.

FIG. 3 and FIG. 4 depict a flow diagram ("flow") 300 illustrating example operations for calculating and correcting a phase error of a shared frequency synthesizer. The flow 300 begins at block 302 in FIG. 3.

At block 302, it is determined, at a GPS navigation device, that a shared frequency synthesizer has been allocated to the GPS navigation device. For example, the phase calculation and correction unit 108 of FIG. 2 can determine that the shared frequency synthesizer 106 has been allocated to the GPS navigation device. In one example, the synthesizer control unit 150 can transmit an indication (e.g., by removing a blanking control signal 146) that the shared frequency synthesizer 106 has been allocated to the GPS navigation device. The flow continues at block 303.

At block 303, a residual DC offset is determined and eliminated. For example, the phase calculation and correction unit 108 can determine the residual DC offset associated with one or more processing components of the GPS navigation device. The phase calculation and correction unit 108 can ensure that the spur generator 104 is disabled (e.g., is not switched on) while determining the residual DC offset. After the phase calculation and correction unit 108 determines the residual DC offset (when the spur generator 104 is disabled), the phase calculation and correction unit 108 can compensate for (e.g., digitally cancel) the residual DC offset for subsequent measurements of the navigation signal. After the phase calculation and correction unit 108 determines the residual DC offset, the phase calculation and correction unit 108 can enable the spur generator 104. The flow continues at block 304.

At block 304, a spur signal at a predetermined reference frequency within the GPS frequency band is generated. For example, the spur generator 104 can generate the spur signal at the predetermined reference frequency within the GPS frequency band. In one example, the spur generator 104 can comprise an inverter (e.g., a square wave generator). The inverter can generate one or more spur signals—each of which is at a harmonic of a base frequency of the system reference clock 102 of FIG. 1. In one example, the system reference clock 102 can be a temperature compensated crystal oscillator (TCXO) with a base frequency of 26 MHz. Spur signals at each multiple of 26 MHz can be generated by applying the 26 MHz base frequency signal to the inverter. It is noted that, in other examples, the system reference clock 102 can be any suitable oscillator with any suitable base frequency (e.g., a 16 MHz crystal oscillator). The spur generator 104 can also comprise one or more spur filters (not shown in FIG. 1) to filter out the spur signals that are at unwanted harmonics of the base frequency of the system reference clock 102, and to select a spur signal at the predetermined reference frequency that lies within (or relatively close to) the GPS frequency band. With reference to the above example, where the system reference clock 102 has a base frequency of 26 MHz, it may be determined that the $61^{st}$ harmonic of the base frequency of the system reference clock 102 (i.e., 1.586 GHz) lies within the GPS frequency band. Therefore, the $61^{st}$ harmonic of the base frequency of the system reference clock 102 can be selected as the predetermined reference frequency. The one or more spur filters of the spur generator 104 can filter out spur signals that are not at the $61^{st}$ harmonic of the base frequency of the system reference clock 102. The spur signal at the predetermined reference frequency can be used to calculate and to correct a phase error associated with the shared frequency synthesizer 106, as will be described below. The flow continues at block 306.

At block 306, the shared frequency synthesizer is synchronized with the spur signal. In one example, the spur generator 104 can provide the spur signal to the shared frequency synthesizer 106 and can cause the shared frequency synthesizer 106 to be synchronized with the predetermined reference frequency. By synchronizing the shared frequency synthesizer 106 with the predetermined reference frequency or aligning the shared frequency synthesizer 106 with the predetermined reference frequency, the shared frequency synthesizer 106 can be configured to generate an output frequency that is equal to the predetermined reference frequency. The flow continues at block 308.

At block 308, a difference frequency signal associated with the shared frequency synthesizer is determined based, at least in part, on the predetermined reference frequency and an output frequency of the shared frequency synthesizer 106. For example, the phase measurement unit 140 can determine the difference frequency signal associated with the shared frequency synthesizer 106. After the residual DC offset associated with various other processing components of the navigation device is measured and eliminated (at block 303), the phase measurement unit 140 can determine the difference frequency signal generated when the spur generator 104 is enabled. For example, the phase measurement unit 140 can mix the spur signal at the predetermined reference frequency with the output frequency signal of the shared frequency synthesizer 106 to generate the difference frequency signal. The phase measurement unit 140 can generate the difference frequency signal based on combining signals (e.g., the output of the frequency synthesizer 106) received from the I-signal ADC 112 and the Q-signal ADC 116 via the I-signal processing unit 114 and the Q-signal processing unit 118, respectively. In one implementation, if the frequency of the shared frequency synthesizer 106 is exactly aligned with the predetermined reference frequency of the spur signal, the generated difference frequency signal can be a DC offset (e.g., a 0 Hz signal) but with a non-zero phase component. This non-zero phase component is the phase error ($\theta$) associated with the shared frequency synthesizer 106. In another implementation, as will be described below, if frequency of the shared frequency synthesizer 106 is not exactly aligned with the predetermined reference frequency of the spur signal, the generated difference frequency signal can have a non-zero frequency component. The flow continues at block 310.

At block 310, an in-phase (I) signal component and a quadrature (Q) signal component of the difference frequency signal is determined. In one example, the phase measurement unit 140 can determine the I-signal component and the Q-signal component of the difference frequency signal. In another example, the difference frequency signal may be provided to the I-signal processing unit 114 and the Q-signal processing unit 118 to yield the I-signal component and the Q-signal component of the difference frequency signal. The flow continues at block 312 in FIG. 4.

At block 312, a phase correction factor associated with the shared frequency synthesizer is calculated based on the I-signal component and the Q-signal component of the difference frequency signal. For example, the phase measurement unit 140 can calculate the non-zero phase component of the difference frequency signal (or the phase error $\theta$ associated with the shared frequency synthesizer 106) based on the I-signal component and the Q-signal component of the difference frequency signal determined at block 310. The phase correction factor can be calculated as $e^{-j2\pi\theta}$ based on knowledge of the phase error associated with the shared frequency synthesizer 106. The phase correction factor can be applied to received GPS signals, as will be described below. After the phase measurement unit 140 determines the phase correction factor, the spur generator 104 can be disabled. In one example, the phase measurement unit 140 can provide, to the spur generator 104, a control signal that serves to disable the spur generator 104. In another example, the synthesizer control unit 150 can provide the control signal to disable the spur generator 104. As will be described below, after the spur generator 104 is disabled, subsequent GPS signals can be received, processed, and corrected by the phase correction factor. The flow continues at block 314.

At block 314, a GPS signal is received at the GPS navigation device. As described above with reference to FIG. 1, the GPS antenna 124 can receive the GPS signal when the GPS navigation device is coupled to the receiver processing circuitry and if collocated communication devices (i.e., communication devices with which the frequency synthesizer 106 is shared) are not scheduled to receive signals. The flow continues at block 316.

At block 316, the received GPS signal is pre-processed. With reference to FIG. 1, the GPS LNA 122 can amplify the received GPS signal. The received GPS signal can be coupled to the I-signal processing unit 114 and the Q-signal processing unit 118 via the switch 120. The I-signal processing unit 114 and the Q-signal processing unit 118 can decompose the GPS signal into its I-signal component and Q-signal component, respectively. The I-signal processing unit 114 and the Q-signal processing unit 118 can also respectively process (e.g., down-convert, amplify, filter, etc.) the I-signal component and the Q-signal component of the received GPS signal. In some implementations, the phase compensation unit 142 can also apply the phase correction factor to the I-signal interpolator 160 and the Q-signal interpolator 162 in the time domain to adjust the effective sampling time of the ADC clock and to compensate for phase errors associated with the ADC clock. The I-signal ADC 112 and the Q-signal ADC 116 can then digitize the I-signal component and the Q-signal component of the received GPS signal, respectively. The flow continues at block 318.

At block 318, the phase correction factor associated with the shared frequency synthesizer is applied to the GPS signal. For example, the phase compensation unit 142 can apply the phase correction factor $e^{-j2\pi\theta}$ (calculated at block 312 of FIG. 4) associated with the shared frequency synthesizer 106. In one example, the phase compensation unit 142 can receive the phase correction factor associated with the shared frequency synthesizer 106 from the phase measurement unit 140. In another example, the phase compensation unit 142 can read the phase correction factor associated with the shared frequency synthesizer 106 from a known memory location. The phase compensation unit 142 can then digitally apply the phase correction factor to the GPS signal at the output of the I-signal ADC 112 and the Q-signal ADC 116. For example, the phase measurement unit 140 may determine that the phase error θ associated with the shared frequency synthesizer is 100 degrees. The phase compensation unit 142 can rotate the phase of the received GPS signal by −100 degrees (e.g., multiply the received GPS signal at the output of the I-signal ADC 112 and the Q-signal ADC 116 by a phase correction factor of $e^{-j2\pi(100)}$) to yield a phase compensated GPS signal. The flow continues at block 320.

At block 320, the phase compensated GPS signal is provided for subsequent processing by the GPS navigation device. For example, the phase compensation unit 142 can provide phase compensated I-signal and Q-signal components of the received GPS signal for subsequent processing by the GPS/WLAN receiver processing unit 110. The phase-compensated I-signal component and phase compensated Q-signal component of the GPS signal can be correlated with a reference PN signal 144. From block 320, the flow ends.

It should be understood that the depicted diagrams (FIGS. 1-4) are examples meant to aid in understanding embodiments and should not be used to limit embodiments or limit scope of the claims. Embodiments may perform additional operations, fewer operations, operations in a different order, operations in parallel, and some operations differently. For example, the operations described herein for calculating the phase correction factor and applying the phase correction factor to the received GPS signals can be executed each time the shared frequency synthesizer 106 is allocated from the collocated WLAN device to the GPS navigation device. In other words, each time the shared frequency synthesizer 106 locks onto the GPS reference carrier frequency, the phase correction factor to be applied to received segments of the GPS signal can be determined so that all the received segments of the GPS signal are coherent with respect to each other. For example, when the shared frequency synthesizer 106 is first allocated to the GPS navigation device, the phase measurement unit 140 may determine that the phase error associated with the shared frequency synthesizer 106 is 100 degrees. On receiving the GPS signals, the phase compensation unit 142 can rotate the phase of the received GPS signals by −100 degrees (e.g., by multiplying the received GPS signals by $e^{j2\pi(100)}$). One or more correlators can correlate the phase compensated received GPS signals with the reference PN signal 144 to generate a first set of measurements until it is determined that the shared frequency synthesizer 106 is to be allocated to the collocated WLAN device. When the shared frequency synthesizer is allocated again to the GPS navigation device, the phase measurement unit 140 can determine that a new phase error associated with the shared frequency synthesizer 106 is −50 degrees. On subsequently receiving the GPS signals, the phase compensation unit 142 can rotate the phase of the received GPS signals by +50 degrees (e.g., by multiplying the received GPS signals by $e^{j2\pi(50)}$). The correlators can correlate and store the phase compensated received GPS signals to generate a second set of measurements. The first set of measurements can be coherently combined with the second set of measurements to determine a position of the GPS navigation device (or routing directions to a destination).

In some implementations, as described with reference to FIGS. 1-4, operations for calculating and correcting the phase error associated with the shared frequency synthesizer 106 may only be executed when the GPS navigation device has control of the shared frequency synthesizer 106. The operations for calculating and correcting the phase error associated with the shared frequency synthesizer 106 may not be executed when the collocated wireless device (e.g., WLAN device, Bluetooth device, etc.) has control of the shared frequency synthesizer 106 because, unlike the GPS navigation device, the WLAN device (or the Bluetooth device) may not assume that the relative phase of the shared frequency synthesizer 106 between consecutive received packets is constant. In other implementations, however, the operations for calculating and correcting the phase error associated with the shared frequency synthesizer 106 may be executed each time the shared frequency synthesizer 106 is switched between the collocated devices (e.g., from the GPS navigation device to the WLAN device and vice versa). For example, in some implementations, such as in beamforming applications, the WLAN device may be required to determine the relative phase of one transmit chain with reference to another transmit chain. Consequently, the WLAN device may need to be aware of phase errors (if any) associated with the shared frequency synthesizer 106. For example, an incorrect beamforming pattern may be produced if a transmitter local oscillator of the WLAN device is at a first phase offset and a receiver local oscillator of the WLAN device is at a second phase offset. For instance, if the transmitter local oscillator is 180 degrees out of phase with the receiver local oscillator, the beamforming pattern could be in a direction that is exactly opposite to the desired direction. The operations described herein with reference to FIGS. 1-4 can be executed by the WLAN device to determine the phase of the transmitter local oscillator relative to the phase of the receiver local oscillator and to compensate for the relative phase error. The operations described herein with reference to FIGS. 1-4 may also be executed in MIMO applications (or in other applications that require precise frequency synthesizer phase calibration across transceiver chains) for detecting the relative phase of multiple local oscillator outputs for multiple transceiver chains after the frequency synthesizer is reset.

It is also noted that in some implementations, the predetermined reference frequency (i.e., the frequency of the spur signal) may not be exactly aligned with (i.e., equal to) the GPS carrier frequency generated by the shared frequency synthesizer 106. However, it may be determined that the predetermined reference frequency is at a known frequency offset from the GPS carrier frequency. The spur signal can be generated so that the predetermined reference frequency is at the known frequency offset from the GPS carrier frequency and the spur signal can be mixed with the GPS carrier frequency generated by the shared frequency synthesizer 106 to yield a difference frequency signal (with a non-zero frequency component and a non-zero phase component). The relative phase between each time interval during which the GPS device has control of the shared frequency synthesizer can be determined to ensure coherent detection at the GPS navigation device. It is noted that because the shared frequency synthesizer 106 is locked to the system reference clock 102 and the spur signal is generated as a harmonic of the base frequency of the system reference clock 102, there may not be a frequency drift between the predetermined reference frequency and the frequency output of shared frequency synthesizer 106.

It is also noted that although FIGS. 1-4 describe a GPS navigation device executing operations for calibration the synthesizer phase, embodiments are not so limited. In other implementations, the WLAN device (or other suitable wireless communication device) can time-share the frequency synthesizer with any suitable navigation device. For example, the navigation device may be configured to receive and process navigation signals from any suitable Global Navigation Satellite Systems (GNSS) such as Global Positioning System (GPS) navigation signals, Global Navigation Satellite System (GLONASS) navigation signals, Galileo navigation signals, a combination of different types of navigation signals (e.g., a combination of GLONASS navigation signals and GPS navigation signals), etc. Accordingly, the receiver unit 110 can comprise appropriate processing circuitry depending on the navigation signals that the navigation device is configured to receive and process. For example, if the navigation device is a GNSS navigation device and is configured to receive and process both GLONASS and GPS navigation signals, both the GLONASS and GPS navigation signals may be processed at a low intermediate frequency after the navigation signals are mixed to baseband. The output frequency of the shared frequency synthesizer 106 can be selected to match the frequency of a harmonic of the system reference clock 102 and so that the output frequency of the shared frequency synthesizer 106 lies between the GPS reference carrier frequency (approximately 1.574 GHz) and the GLONASS reference carrier frequency (approximately 1.602 GHz).

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
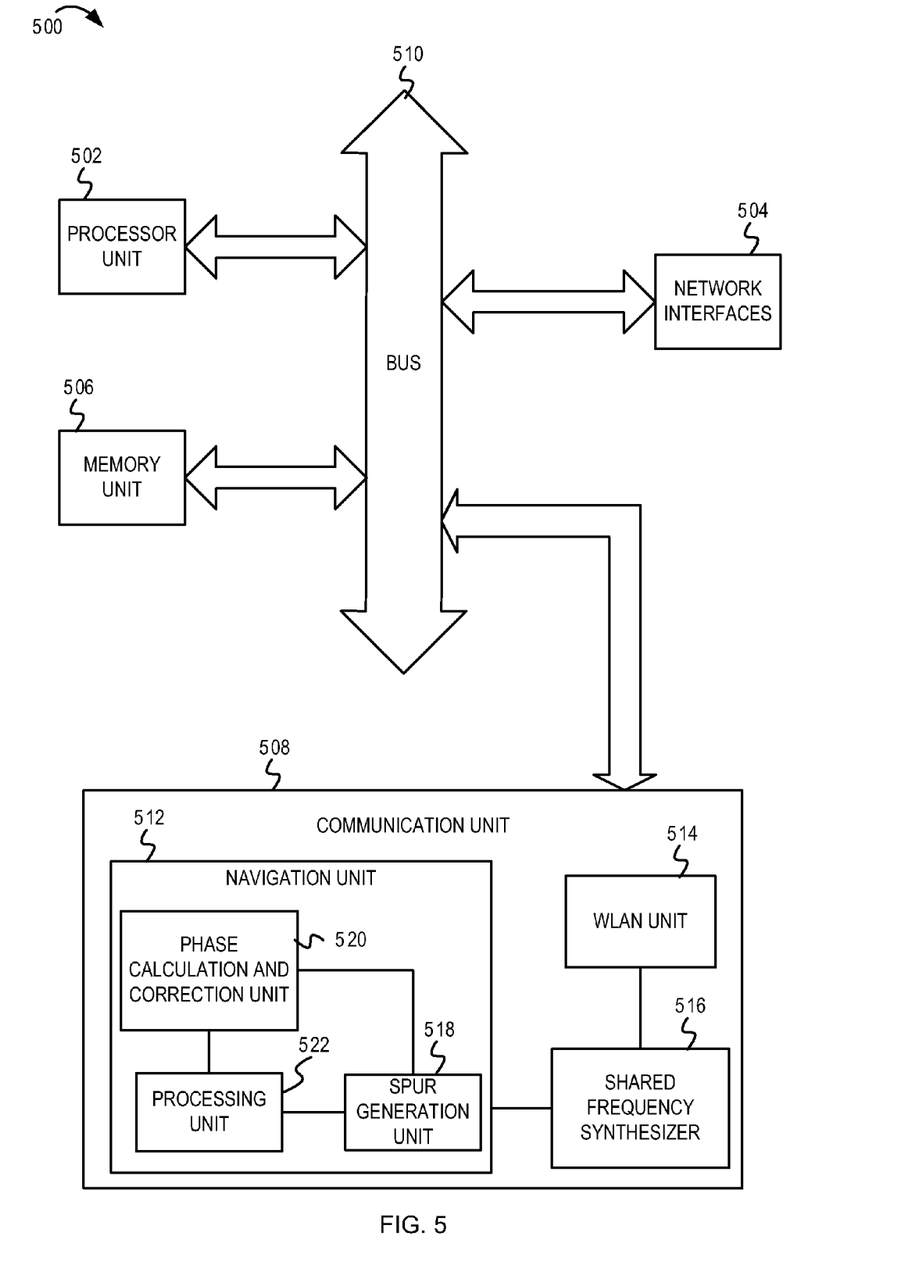
FIG. 5 is a block diagram of a computer system including a mechanism for calibrating phase of a shared frequency synthesizer using a reference harmonic.

FIG. 5 is a block diagram of an electronic device 500 including a mechanism for calibrating phase of a shared frequency synthesizer using a reference harmonic. In some implementations, the electronic device 500 may be one of a personal computer (PC), a laptop, a netbook, a mobile phone, a personal digital assistant (PDA), or another electronic system comprising a two or more communication devices that share a common frequency synthesizer. In one example, the electronic device 500 can comprise a Bluetooth device and a navigation device that share a common frequency synthesizer. In another example, the electronic device 500 can comprise a WLAN device and a navigation device that share a common frequency synthesizer. The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, etc.), and network interfaces 504 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface).

The electronic device 500 also comprises a communication unit 508. The communication unit 508 comprises a navigation unit 512 and a WLAN unit 514. In one embodiment, the navigation unit 512 and the WLAN unit 514 may be collocated on a common chip or a common integrated circuit within the electronic device 500 as depicted in FIG. 5. In another embodiment, the navigation device 512 and the WLAN unit 514 may be implemented on separate chips. Furthermore, it is noted that in some implementations, the communication unit 508 may comprise one or more additional wireless network devices (e.g., a Bluetooth device) or wired network devices (e.g., an Ethernet device). In FIG. 5, the navigation unit 512 comprises a spur generation unit 518, a processing unit 522, and a phase calculation and correction unit 520. The navigation unit 512 and the WLAN unit 514 also share a frequency synthesizer 516. The phase calculation and correction unit 520 in conjunction with the spur generation unit 518 can calculate and correct phase errors associated with the shared frequency synthesizer 516 when the shared frequency synthesizer 516 is allocated to the navigation unit 512, as described with reference to FIG. 1-4.

Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for calibrating synthesizer phase using a reference harmonic as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, at a first network device, that a shared frequency synthesizer that is shared between the first network device and a second collocated network device has been allocated to the first network device;
    generating a predetermined reference frequency that is associated with an operating frequency band of the first network device;
    aligning an output frequency of the shared frequency synthesizer with the predetermined reference frequency;
    generating a difference frequency signal based, at least in part, on the output frequency of the shared frequency synthesizer and the predetermined reference frequency;
    determining a phase correction factor associated with the shared frequency synthesizer based, at least in part, on the difference frequency signal;
    applying the phase correction factor to a signal received at the first network device to correct a phase error associated with the shared frequency synthesizer.

2. The method of claim 1, wherein said determining the phase correction factor associated with the shared frequency synthesizer based, at least in part, on the difference frequency signal comprises:
    determining an in-phase signal component of the difference frequency signal and a quadrature component of the difference frequency signal;
    calculating the phase error associated with the shared frequency synthesizer based on the in-phase signal component of the difference frequency signal and the quadrature component of the difference frequency signal; and
    calculating the phase correction factor based on the phase error associated with the shared frequency synthesizer.

3. The method of claim 2, wherein said applying the phase correction factor to the signal received at the first network device comprises:
    rotating a phase of the signal received at the first network device by the phase correction factor.

4. The method of claim 1, wherein the first network device comprises a satellite navigation device, and the second network device comprises a wired communication device or a wireless communication device.

5. The method of claim 1, wherein the first network device comprises at least one of a global positioning satellite (GPS) navigation device, a global navigation satellite system (GLONASS) navigation device, and a Galileo navigation device, and wherein the second network device comprises a wireless local area network (WLAN) device or a Bluetooth device.

6. The method of claim 1, wherein the first network device comprises a WLAN device or a Bluetooth device, and wherein the second network device comprises at least one of a GPS navigation device, a GLONASS navigation device, and a Galileo navigation device.

7. The method of claim 1, wherein said aligning the output frequency of the shared frequency synthesizer with the predetermined reference frequency comprises:
    providing a spur signal at the predetermined reference frequency to the shared frequency synthesizer; and
    causing the shared frequency synthesizer to generate an output signal such that the output frequency of the output signal is equal to the predetermined reference frequency.

8. The method of claim 7, wherein said generating the predetermined reference frequency that is associated with the operating frequency band of the first network device comprises:
    generating, from a system reference clock frequency associated with the first network device and the second collocated network device, a plurality of spur frequency signals that are at harmonic frequencies of the system reference clock frequency; and
    filtering the plurality of spur frequency signals to yield one of the plurality of spur frequency signals at the predetermined reference frequency.

9. The method of claim 1, further comprising:
    determining that the second network device is scheduled to receive a signal;
    allocating the shared frequency synthesizer to the second network device; and
    generate a blanking signal to indicate said allocating the shared frequency synthesizer to the second network device.

10. The method of claim 1, further comprising:
    adjusting a sampling time associated with a clock of one or more analog to digital converters associated with the first network device based, at least in part, on the phase correction factor associated with the shared frequency synthesizer.

11. An apparatus comprising:
    a shared frequency synthesizer operable to:
        generate a reference frequency signal for processing communication signals, wherein the shared frequency synthesizer is shared between a first network device and a second collocated network device of the apparatus;
    a reference frequency generator coupled with the shared frequency synthesizer and operable to:
        generate a predetermined reference frequency that is associated with an operating frequency band of the first network device when the shared frequency synthesizer is allocated to the first network device;
    a phase measurement unit operable to:
        align an output frequency of the shared frequency synthesizer with the predetermined reference frequency;
        generate a difference frequency signal based, at least in part, on the output frequency of the shared frequency synthesizer and the predetermined reference frequency;
        determine a phase correction factor associated with the shared frequency synthesizer based, at least in part, on the difference frequency signal; and
    a phase compensation unit operable to:
        apply the phase correction factor to a signal received at the first network device to correct a phase error associated with the shared frequency synthesizer.

12. The apparatus of claim 11, wherein the phase measurement unit operable to determine the phase correction factor associated with the shared frequency synthesizer based, at least in part, on the difference frequency signal comprises the phase measurement unit operable to:

determine an in-phase signal component of the difference frequency signal and a quadrature component of the difference frequency signal;

calculate the phase error associated with the shared frequency synthesizer based on the in-phase signal component of the difference frequency signal and the quadrature component of the difference frequency signal; and calculate the phase correction factor based on the phase error associated with the shared frequency synthesizer.

13. The apparatus of claim 12, wherein the phase measurement unit operable to apply the phase correction factor to the signal received at the first network device comprises the phase measurement unit operable to:

rotate a phase of the signal received at the first network device by the phase correction factor.

14. The apparatus of claim 11, wherein the first network device comprises a satellite navigation device, and the second network device comprises a wired communication device or a wireless communication device.

15. The apparatus of claim 14, wherein the apparatus comprises an integrated circuit comprising the first network device and the second network device, wherein the first network device comprises at least one of a global positioning satellite (GPS) navigation device a global navigation satellite system (GLONASS) navigation device, and a Galileo navigation device, and wherein the second network device comprises a wireless local area network (WLAN) device or a Bluetooth device.

16. The apparatus of claim 11, wherein the phase measurement unit operable to align the output frequency of the shared frequency synthesizer with the predetermined reference frequency comprises the reference frequency generation unit operable to:

provide a spur signal at the predetermined reference frequency to the shared frequency synthesizer; and cause the shared frequency synthesizer to generate an output signal such that the output frequency of the output signal is equal to the predetermined reference frequency.

17. The apparatus of claim 16, wherein the reference frequency generation unit operable to generate the predetermined reference frequency that is associated with the operating frequency band of the first network device comprises the reference frequency generation unit operable to:

generate, from a system reference clock frequency associated with the first network device and the second collocated network device a plurality of spur frequency signals that are at harmonic frequencies of system reference clock frequency; and filter the plurality of spur frequency signals to yield one of the plurality of spur frequency signals at the predetermined reference frequency.

18. The apparatus of claim 11, further comprising a synthesizer control unit operable to:

determine that the second network device is scheduled to receive a signal;

allocate the shared frequency synthesizer to the second network device; and generate a blanking signal to indicate that the shared frequency synthesizer has been allocated to the second network device.

19. The apparatus of claim 11, further comprising a synthesizer control unit operable to:

determine that the shared frequency synthesizer has been allocated to the first network device; and provide, to the first network device, an indication that the shared frequency synthesizer has been allocated to the first network device.

20. The apparatus of claim 11, further comprising an interpolator operable to:

adjust a sampling time associated with a clock of one or more analog to digital converters associated with the first network device based, at least in part, on the phase correction factor associated with the shared frequency synthesizer.

21. A network device comprising:

a shared frequency synthesizer operable to:

generate a reference frequency signal for processing communication signals, wherein the shared frequency synthesizer is shared between a navigation device and a collocated wireless network device of the network device;

a spur generation unit operable to:

generate a spur signal at a predetermined reference frequency that is associated with an operating frequency band of the navigation device when the shared frequency synthesizer is allocated to the navigation device;

provide the spur signal at the predetermined reference frequency to the shared frequency synthesizer; and cause the shared frequency synthesizer to generate an output signal such that an output frequency of the output signal is equal to the predetermined reference frequency;

a phase measurement unit operable to:

generate a difference frequency signal based, at least in part, on the output frequency of the shared frequency synthesizer and the predetermined reference frequency;

determine an in-phase signal component of the difference frequency signal and a quadrature component of the difference frequency signal;

calculate a phase error associated with the shared frequency synthesizer based on the in-phase signal component of the difference frequency signal and the quadrature component of the difference frequency signal; and calculate a phase correction factor associated with the shared frequency synthesizer based on the phase error associated with the shared frequency synthesizer; and a phase compensation unit operable to:

apply the phase correction factor to a signal received at the navigation device to correct a phase error associated with the shared frequency synthesizer.

22. The network device of claim 21, wherein the phase measurement unit operable to apply the phase correction factor to the signal received at the navigation device comprises the phase measurement unit operable to:

rotate a phase of the signal received at the navigation device by the phase correction factor.

23. The network device of claim 21, wherein the spur generation unit operable to generate the predetermined reference frequency that is associated with the operating frequency band of the navigation device comprises the spur generation unit operable to:

generate, from a system reference clock frequency associated with the first network device and the second collocated network device, a plurality of spur frequency signals that are at harmonic frequencies of the system reference clock frequency; and filter the plurality of spur frequency signals to yield one of the plurality of spur frequency signals at the predetermined reference frequency.

24. The network device of claim 21, wherein the network device comprises an integrated circuit comprising the navigation device and the wireless network device, wherein the navigation device comprises at least one of a global positioning satellite (GPS) navigation device, a global navigation satellite system (GLONASS) navigation device, and a Galileo navigation device, and wherein the wireless network device comprises a wireless local area network (WLAN) device or a Bluetooth device.

25. The network device of claim 21, wherein the phase compensation unit operable to apply the phase correction factor to the signal received at the navigation device to correct the phase error associated with the shared frequency synthesizer comprises:

an in-phase signal processing unit operable to:
   determine an in-phase signal component of the signal received at the navigation device;
a quadrature signal processing unit operable to:
   determine a quadrature signal component of the signal received at the navigation device; and
the phase compensation unit operable to:
   receive the in-phase signal component of the signal from the in-phase signal processing unit and the quadrature signal component of the signal from the quadrature signal processing unit; and
   apply the phase correction factor to the in-phase signal component of the signal and the quadrature signal component of the signal to correct the phase error associated with the shared frequency synthesizer.

* * * * *